March 31, 1931.  J. E. WOODRUFF  1,798,859
ELECTRIC CABLE
Filed June 21, 1926
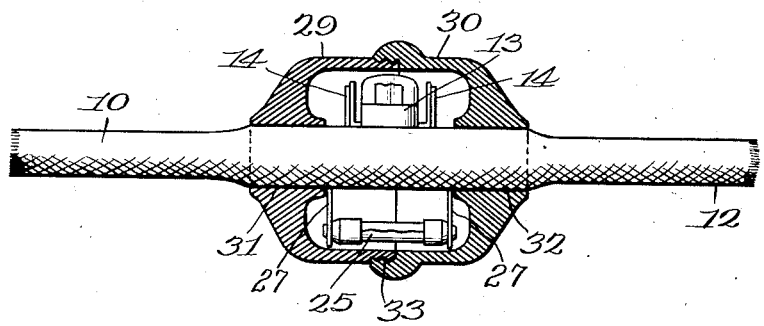
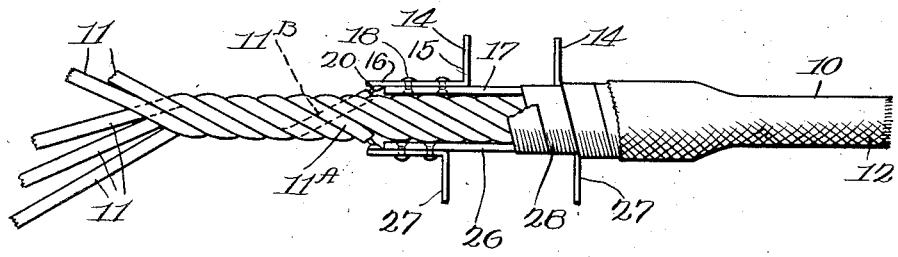
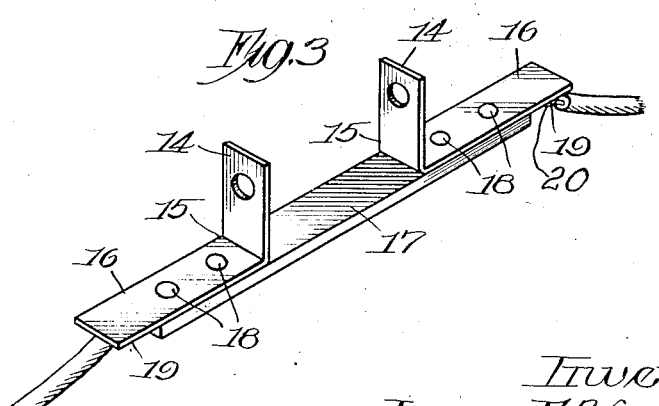
Inventor:
James E. Woodruff
By Fisher, Towle, Clapp & Soans
Attys.

Patented Mar. 31, 1931

1,798,859

UNITED STATES PATENT OFFICE

JAMES E. WOODRUFF, OF CHICAGO, ILLINOIS, ASSIGNOR TO BELDEN MANUFACTURING COMPANY, OF CHICAGO, ILLINOIS, A CORPORATION OF ILLINOIS

ELECTRIC CABLE

Application filed June 21, 1926. Serial No. 117,231.

This invention relates to electric cables, and more particularly to radio cables having a plurality of relatively insulated conductors grouped together and covered by a single covering.

The main objects of the invention are to provide means in a cable of the above described class for preventing an overload of electrical energy from reaching certain parts of a radio set or other device to which a certain conductor of the cable is connected, to provide means built into the cable for mounting a fuse or other circuit-breaking device, and to provide means for protecting the circuit breaking device and mounting therefor, from danger of damage from outside forces.

Further objects are to provide a cable of the above described class provided with means for preventing the passage of excessive electric currents through certain conductors, which means will be simple, not readily disarranged, economical to manufacture, and in which the current limiting means may be readily changed from one capacity to another.

Other objects and advantages will become apparent when the following specification is considered in connection with the accompanying drawing wherein I have illustrated a selected embodiment of my invention, and in which Fig. 1 is a longitudinal section along a cable showing certain parts of the invention in elevation and other parts in section.

Fig. 2 is an elevation partly broken away to more clearly illustrate the construction, and Fig. 3 is a perspective of one of the fuse clips according to the present invention.

Referring now to the drawings, 10 indicates a cable having a plurality of insulated conductors indicated at 11—11 grouped and twisted together so as to form a firm and compact cable, and 12 indicates a covering which is preferably of braided fabric. In Fig. 1, a fuse, such as adapted to use in the B battery circuit of a radio receiving set, is shown at 13. The fuse 13 is mounted between clip members 14—14 and adapted to be held therein by friction or other suitable means. As best shown in Figs. 2 and 3, clip members 14 preferably comprise upstanding legs of angle members 15. The angle members 15 are mounted so as to be insulated from each other, and they each have another leg 16 which is laid flat on a strip 17 which strip is preferably of insulating material. These members are then secured to the strip by suitable means such as rivets 18—18 passing through the leg 16 of each, and through the strip. The leg 16 of the angle members 15 is preferably of such length, and so positioned on the strip 17, that a portion of the leg will project beyond the ends of the strip 17 as indicated at 19. The strip 17 with the clip members mounted thereon is then positioned against one side of the cable as shown in Fig. 2. One of the conductors 11—B which is to carry a current, the amperage of which it is desired to limit, is severed and one of the severed ends is connected to the projecting portion 19 of the clip by suitable means, such as soldering, as indicated at 20. The other end of the severed cable is connected to the oppositely disposed clip in a similar manner. It will be apparent that when a fuse is disposed between the clip members 14—14, that the current carried by the conductor 11—B will be limited to the capacity of the particular fuse used, and that excessive current will cause the fuse to melt, and the circuit thereby broken.

I also find it convenient to provide means for receiving another fuse 25, which means may comprise an insulating strip 26 and suitable clip members 27—27, similar in construction to the above described fuse mounting means and interposed in a conductor 11—A in a similar manner. A suitable fuse or other current limiting means may thus be interposed in the circuit, of which conductor 11—A is a part. While in the present embodiment of my invention, I provide for only two of a plurality of conductors comprising a cable, it is of course obvious that as many as desired may be provided without departing from the spirit of the invention.

In the present embodiment of my invention, where two fuses are used, I provide the respective fuse mountings of different size to receive different sized fuses, as shown, so that the fuses can not be interchanged. Other means may obviously be provided to prevent such interchanging.

The mounting members above described may be secured in place on the sides of the cable by any suitable means. In the present instance, I prefer to secure the said mounting means in place by means of a spiral winding of friction tape indicated at 28, which tape is a non-conductor of electricity, and which effectively ties the said mounting means to the cable. For further securing the fuse clips in place and to protect the friction tape 28, the braided covering 12 may be continued over the said spiral winding so as to leave only the fuse mounting arms of the clips projecting therethrough whereby the general appearance of the structure is improved.

To further improve the appearance of the cable, and to protect the fuse mounting and fuses thereon from danger of injury by outside forces, I prefer to provide a cover such as indicated in Fig. 1. This cover comprises a shell having a pair of sections 29 and 30 which are provided at their respective ends with apertures 31 and 32, through which the cable may be passed. The sections may be joined by suitable means, for instance screw threading as indicated at 33, whereby they may be readily separated so as to provide access to the fuses and whereby the fuses may be readily changed. I also prefer to make the apertures 31 and 32 to fit the cable rather closely and with comparatively long bearing surfaces as clearly shown in said Fig. 1, whereby flexing of the portion of the cable within the covering with consequent possible disturbance of the fuse mounting is practically eliminated. It will be noted that the strips 17 and 26 respectively, of the fuse clips if made stout enough, will also tend to prevent such flexing, but in order to retain compactness and economy of the structure, I prefer to provide these strips of comparatively thin material, which of itself may flex to some extent, and for this reason additional means for preventing the said flexing of the cable is desirable.

When the two parts of the shell are connected together, as shown in the drawing, it will be noted that movement along the cable is limited by engagement of the inner ends of the long bearing portions with the fuse clip members 27—27. By this means possible disturbance of the fuses or their respective mounts, by axial movement of the cover, is avoided.

I have thus provided means built in an electric cable for limiting the current which may pass through the cable, which means are simple, flexible in capacity, readily changed by an unskilled person, and which will withstand careless handling.

I am aware that various changes in the construction may be made without departing from the spirit of the invention, and I therefore reserve the right to make such changes as fall within the scope of the following claims.

I claim as my invention:

1. In combination with a cable which includes a plurality of relatively insulated conductors grouped together, a plurality of circuit breaker mounting means respectively included in the circuits of independent conductors which conductors are adapted to carry electric currents of different strengths, a plurality of circuit breakers removably mounted in said mounting means, and means for preventing interchanging of said circuit breakers.

2. In combination with a cable which includes a plurality of relatively insulated conductors grouped together, a plurality of fuse clips respectively included in the circuits of independent conductors which conductors are adapted to carry electric currents of different strengths, a plurality of fuses removably mounted in said clips and means for preventing interchanging of said fuses.

3. The combination with a cable comprising a plurality of relatively insulated conductors grouped together and covered with a flexible covering, a circuit breaker mounting means supported by said cable and comprising a strip of inextensible material disposed along said cable, a pair of relatively insulated clip members interposed in the circuit of one of said conductors and secured to said strip in spaced relation, said clips being adapted to receive a circuit breaker therebetween, said flexible covering extending over said strip and said clip members extending outwardly therefrom through said covering.

4. The combination with a cable comprising a plurality of relatively insulated conductors grouped together and covered with a braided fabric covering, a circuit breaker, mounting means for said circuit breaker mounted on said cable and comprising a strip of inextensible material, a pair of relatively insulated clip members interposed in the circuit of one of said conductors and secured in spaced relation to said strip, said clips being adapted to receive said circuit breaker removably therebetween, said strip being disposed along said cable beneath said covering and said clip members extending outwardly through said covering.

5. In combination with a cable comprising a plurality of relatively insulated conductors, grouped together and covered with a braided fabric covering, a fuse mounting means mounted on the cable and comprising a strip of inextensible insulating material disposed along said cable and underneath said covering, and a pair of spaced clip members mounted on said strip and included in the circuit of one of said conductors, said clip members projecting outwardly from said cable and adapted to removably receive a fuse.

6. In combination, an electric conductor, a fuse, means for mounting said fuse so as to include the same in the circuit of said conductor comprising a strip of inextensible material, a pair of relatively insulated clip members secured to said strip in relatively spaced relation, said conductor being severed, and the severed ends being substantially aligned and respectively connected to said clip members, and a two part separable casing normally enclosing said strip, fuse, and fuse clips, the parts of said casing being apertured to receive the respective ends of the conductors, and one of said parts being slidable on said conductor to expose the fuse.

7. In combination, an electric conductor, a fuse, means for mounting said fuse so as to include the same in the circuit of said conductor comprising a strip of inextensible material, a pair of relatively insulated fuse clip members secured to said strip in relatively spaced relation, said conductor being severed, and the severed ends being substantially axially aligned and respectively connected to said clip members, and a casing normally enclosing said fuse and fuse clip members comprising a pair of axially aligned sleeve members slidably mounted on the respective severed portions of the conductor and having their adjacent ends interlocked with each other so as to permit the casing to be separated for permitting access to the fuse.

8. In combination, an electric conductor, a fuse, means for mounting said fuse so as to include the same in the circuit of said conductor comprising a strip of inextensible material, a pair of relatively insulated fuse clip members secured to said strip in relatively spaced relation, said conductor being severed, and the severed ends being substantially axially aligned and respectively connected to said clip members, and a casing normally enclosing said fuse and fuse clip members comprising a pair of axially aligned sleeve members slidably mounted on the respective severed portions of the conductor and having their adjacent ends interlocked with each other so as to permit the casing to be separated for permitting access to the fuse, the outer end of each of said sleeve members being provided with a closure portion apertured to slidably fit the conductor, and said apertured ends having relatively long bearing surfaces engaging the conductor for preventing excessive flexing of the conductor within the casing.

9. In combination, a conductor, a fuse, means for mounting said fuse so as to include the same in the circuit of said conductor, said means including a pair of spaced and relatively insulated fuse clips adapted to receive the fuse, said conductor being severed and the severed ends thereof being respectively connected to said fuse clips, a casing normally enclosing said fuse clips and fuse, comprising a pair of separably interlocked parts, slidably mounted on the conductor, and each of said parts having a portion engaging the adjacent fuse clip for positioning the casing over the fuse and preventing sliding of the casing along the conductor when said parts are interlocked.

10. In combination, a conductor, a fuse, means for mounting said fuse so as to include the same in the circuit of said conductor, said means comprising a strip of inextensible material, a pair of spaced and relatively insulated fuse clips mounted on said strip and having portions projecting laterally therefrom for receiving said fuse to include the same in said circuit, said conductor being severed and the severed ends being arranged in substantially axial alignment and respectively connected to said fuse clips, a casing normally enclosing said fuse clips and comprising a pair of separably interlocked parts, each slidably mounted on the conductor, and each having a portion engaging the adjacent laterally projecting fuse clip portion while the parts are interlocked, thereby to prevent sliding of the casing along the conductor and to retain the casing in position over the fuse and fuse clips.

11. As a new article of manufacture, a radio or like cable comprising a plurality of flexible conductors grouped and bound together to form a flexible cable, one of the conductors being severed intermediate its ends, a pair of fuse clips respectively connected to the severed conductor ends without separating material lengths of said severed conductor from the cable, and a casing carried by said cable and enclosing said fuse clips, the conductor portions which are separated from the cable as an incident to the connection of said fuse clips thereto, and the adjacent cable portion.

JAMES E. WOODRUFF.